July 31, 1923.

Re. 15,667

H. SIMMONS

SHIELD

Original Filed Feb. 9, 1921

Inventor:
Harry Simmons
By Parker & Carter Attys.

Reissued July 31, 1923.

Re. 15,667

UNITED STATES PATENT OFFICE.

HARRY SIMMONS, OF SPOKANE, WASHINGTON.

SHIELD.

Original No. 1,399,446, dated December 6, 1921, Serial No. 443,684, filed February 9, 1921. Application for reissue filed January 17, 1923. Serial No. 613,300.

*To all whom it may concern:*

Be it known that I, HARRY SIMMONS, a citizen of the United States, residing at Spokane, in the county of Spokane and State of Washington, have invented a certain new and useful Improvement in Shields, of which the following is a specification.

My present invention relates to an improved shield for automobiles and similar vehicles to be used in conjunction with the usual transparent wind shields, as an additional protection against rain, snow, or other prevailing weather conditions that would interfere with the transparency of the usual windshield and prevent clear vision therethrough.

One object of the invention is the provision of an auxiliary shield or shade that may readily be attached to the front or forward end of the automobile top or cover, and located in such position with relation to the well known form of transparent or glass windshield as to be available for use not only as a shield or protector for the glass when required, but also as an opaque shade against reflected light to insure perfect vision of the driver.

Another object of the invention is to provide a shield that can be easily and quickly adjusted to various positions by the driver while the car is running. Another object of the invention is to provide a shield which can be adjusted by the driver with one hand, thus permitting the driver to use the other hand to manipulate the steering wheel.

To this end the invention consists in certain novel combinations and arrangements of parts embodied in an adjustable shield located in convenient and accessible position for the driver, which may be manipulated with facility, is durable, and is a comparatively perfect device for performing its required functions.

In the accompanying drawings I have illustrated one complete example of the physical embodiment of my invention.

Figure 1:
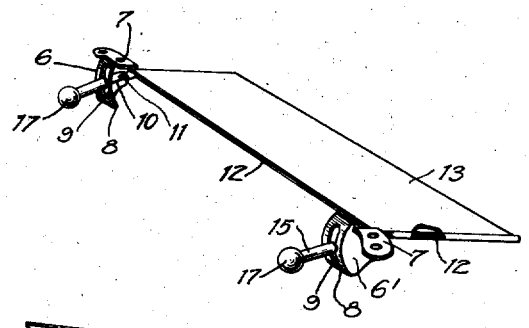
Figure 1 is a perspective view of one form of shield embodying my invention, ready for attachment to an automobile.
Figure 2:
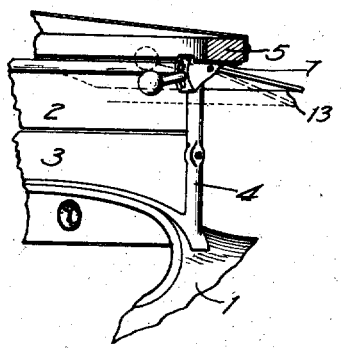
Fig. 2 is a perspective view, partly in section showing the shield in position on the front portion of an automobile.

In order that the general assembly and relation of parts may be readily understood I have illustrated a portion of an automobile as 1 in Fig. 2, wherein are also shown the usual adjustable upper and lower transparent windshields 2 and 3, and the windshield post 4. The device of the invention may be separately attached to the frame bar 5 of the cover or top of the automobile and it will be apparent that automobiles may be equipped with my device as an auxiliary or accessory for use in connection with the usual windshields of the automobile, as shown in Fig. 2.

The shield or shade of the invention is attached to the automobile in any desired manner. As herein shown it is attached to the part or bar 5 by means of a pair of complementary brackets 6 and 6′ each provided with a horizontal, perforated flange 7, and these brackets are attached at the underside of the bar 5 at the ends of this bar adjacent to the windshield posts 4. The brackets are of metal and each is fashioned with a curved or vertically disposed part or flange 8 located at the rear of the bracket and extending inwardly or toward the longitudinal axis of the automobile, and as shown in the drawings the curved or arcuate flange of each bracket is provided with a slot 9. The shield proper is pivotally connected with the brackets 6 and 6′. This pivotal connection may be made in any desired manner. As herein shown, to each bracket is pivoted a part 10 forming a head with its pivot at 11 in the vertical wall of the bracket, and each head is fashioned with a forwardly projecting arm 12 having a series of perforations therein for securing the edges of the shield 13. The shield is rectangular in form and of any suitable material, and may be composed of fairly stiff board as a filler between coverings which may be of weather proof material and polished or finished to provide an attractive appearance, and the shield thus formed furnishes an opaque, rigid, light, but strong body of which the two spaced arms 12 form a part. The shield projects from under the transverse top-frame bar 5 a suitable dis-

BEST AVAILABLE COPY tance ahead of the automobile to perform its functions as a protector for the glass windshields 2 and 3, and is adjustable on its pivotal supports 11 from a horizontal position to angles of different degrees for various purposes.

When the automobile is running it is necessary that the driver shall have at least one hand upon the steering wheel, and I have provided means whereby the driver can easily adjust the shield with one hand, keeping the other hand on the wheel so as to have the automobile always under control and permit the shield to be easily and quickly adjusted to any position while the automobile is in motion. For purposes of illustration I have shown one particular construction for this purpose.

Figure 3:
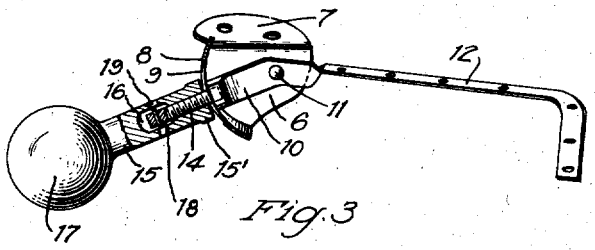
Fig. 3 is an enlarged, detail view, partly in section, of part of the device showing one form of controlling mechanism for the shield.

At the rear, each of the heads 10 is provided with a threaded stud 14, located and adapted to swing through the slot 9 of the bracket, and by means of the threaded sleeve 15 whose head 15′ is adapted to bear against the arcuate flange 8 of the bracket, the head 10 may be clamped in position. The sleeve is interiorly threaded to act as a clamping nut on the threaded stud, and in addition to the threaded bore, an enlargement or pocket 16 is provided in the sleeve, as best seen in Fig. 3.

When the driver desires to adjust the shield, he grasps the controlling handpiece 17 at one side of the shield and moves it to unlock that side of the shield, keeping one hand on the steering wheel. He then releases the handpiece 17 and the device at the other side of the shield, being locked, holds the shield from movement. The driver then grasps the wheel with the hand which he has just used to manipulate the handpiece 17 and with the other hand grasps the handpiece 17 at the opposite side of the shield and moves it to unlock the shield and then with this same handpiece moves the shield to the desired, adjusted position and then by manipulating the same handpiece locks it in position. He may then change hands on the wheel and move the other handpiece to the locked position, thus giving the shield a double lock. The single lock on one side will ordinarily lock the shield but the double lock is used to prevent the shield from jarring out of its adjusted position. It will be noted that by means of this construction the same handpiece that is grasped by one hand of the operator to move the shield is also utilized to lock the shield in any desired position. This permits the driver, for example, to use one hand to unlock the shield, move it to any desired position and then lock it in this position without removing his hand from the controlling hand piece. In order to facilitate the movement of the shield I may provide some suitable means for making it unnecessary for the driver to move the weight of the shield, such, for example, as by providing means to assist the driver in moving the shield. In the drawings I have shown one construction for this purpose wherein each tubular member or sleeve is fashioned with a spherical knob 17 which is of sufficient size and weight to counter-balance the weight of the shield or shade 13 at the opposite side of the pivotal supports 11 therefor.

A tapered pin 18 is passed transversely through an opening in the end of the stud 14 with its ends projecting out into the pocket 16, to allow free movement of the threaded sleeve on the stud, but prevent the sleeve from becoming displaced or lost from the stud, due to vibration of the traveling car. To permit ready insertion of the retaining pin in the stud, I provide a pair of opposed and alined, transverse openings 19 through the sleeve, and the pin may be inserted through one opening, and driven out, if required by a tool inserted in the opening. By tapping on the tool the pin may be dislodged, and then the sleeve is free to be turned entirely off the stud, if desired. In the construction shown the shield and the controlling handpiece have a common movable connection with the support.

I have described in detail a particular construction embodying my invention, but it is of course apparent that the parts may be varied in many particulars without departing from the spirit of the invention embodied in the claims hereto appended, and I therefore do not limit myself to the particular construction shown.

Having thus fully described my invention, what I claim as new and desire to secure by Letters Patent is—

1. The combination with a pair of spaced brackets, of a head pivoted in each bracket, arms on said heads and a shield on said arms, a slotted flange on one of said brackets, a threaded stud on a head movable in said slotted flange, a clamp member on said threaded stud adapted to engage said flange, and a counterweight on said clamp member.

2. The combination with a pair of spaced brackets, of a shield having heads pivoted therein, an arcuate, slotted flange on one bracket, a threaded stud on a head passing through said slotted flange, a threaded sleeve on the stud adapted to frictionally engage the flange, and a counter-balancing weight on said sleeve.

3. The combination in a device as described with a supporting bracket having an arcuate, slotted flange, of a head pivoted in the slot and formed with a threaded stud extension passed through the slotted flange, a sleeve threaded on the stud and having a head to frictionally engage the flange, and a weight carried by said sleeve for the purpose described.

4. The combination with a pair of brackets each having an arcuate, slotted flange, of a shield having spaced arms, heads on said arms pivotally supported in said brackets, threaded studs on said heads passed through said slotted flanges, a sleeve threaded on each stud and adapted to frictionally engage a slotted flange, and a weight carried by each sleeve.

5. The combination with a shield of a support therefor, a controlling handpiece by means of which said shield is moved to adjust it to various positions, said shield and controlling hand piece having a common pivot connecting both said shield and hand piece with said support and locking means controlled by said handpiece for locking the shield in its adjusted position.

6. The combination with a shield of a support therefor, a movable connection between the shield and the support, a controlling handpiece by means of which said shield is moved to adjust it to various positions, locking means controlled by said handpiece for locking the shield in its adjusted position, and a device acting when the locking means is released, as a counterbalancing device for the shield.

7. The combination with a shield of a support therefor, a movable connection between said support and said shield, a rotatable controlling handpiece by means of which said shield is moved to adjust it to various positions, and locking means actuated by rotating the handpiece for locking the shield in its adjusted position.

8. The combination with a shield of spaced arms connected therewith, brackets connected with a fixed part of the automobile, pivotal connections between said arms and said brackets, a vertically disposed flange associated with each bracket, a handpiece connected with each of said arms and by means of which the arms are moved to move the shield, the handpieces being rotatably connected with said arms, opposed locking parts on the arms and the handpieces between which said vertically disposed flanges are received and which are moved toward and from each other by moving the handpieces, to lock and unlock the shield.

HARRY SIMMONS.